United States Patent
Peters et al.

(10) Patent No.: US 7,977,413 B2
(45) Date of Patent: Jul. 12, 2011

(54) THERMALLY RESPONSIVE INK AND COATING COMPOSITIONS

(75) Inventors: Andrea Jeannine Peters, Clifton Park, NY (US); James Anthony Cella, Clifton Park, NY (US); Thomas Joseph Fyvie, Schenectady, NY (US); David Gilles Gascoyne, Niskayuna, NY (US); Timothy Leigh Chuck, Glenville, NY (US); James Mitchell White, Niskayuna, NY (US); Matthew Jeremiah Misner, Delanson, NY (US); Whitney Jeanne Olson, Scotia, NY (US); Marc Brian Wisnudel, Glen Rock, NJ (US); Trevor James Dale, Selkirk, NY (US)

(73) Assignee: NBCUniversal Media LLC, New York, NY (US)

( * ) Notice: Subject to any disclaimer, the term of this patent is extended or adjusted under 35 U.S.C. 154(b) by 322 days.

(21) Appl. No.: 12/403,882

(22) Filed: Mar. 13, 2009

(65) Prior Publication Data

US 2010/0234493 A1    Sep. 16, 2010

(51) Int. Cl.
    *C08K 5/00*    (2006.01)
    *C08K 5/15*    (2006.01)
(52) U.S. Cl. .......................... 524/83; 524/111
(58) Field of Classification Search .................. 524/83, 524/111
    See application file for complete search history.

(56) References Cited

U.S. PATENT DOCUMENTS

| | | | |
|---|---|---|---|
| 5,916,680 A * | 6/1999 | Wakata et al. | 428/402.21 |
| 6,790,501 B2 | 9/2004 | Van de Grampel et al. | |
| 6,795,464 B2 | 9/2004 | Lawandy | |
| 7,227,445 B2 | 6/2007 | Atkinson | |
| 2002/0163479 A1 | 11/2002 | Lin et al. | |
| 2003/0081521 A1 | 5/2003 | Solomon et al. | |
| 2004/0022542 A1 | 2/2004 | Atkinson | |
| 2004/0054594 A1 | 3/2004 | Forster et al. | |
| 2004/0083377 A1 | 4/2004 | Wu et al. | |
| 2005/0005285 A1 | 1/2005 | Olson et al. | |
| 2005/0110978 A1 | 5/2005 | Potyrailo et al. | |

(Continued)

FOREIGN PATENT DOCUMENTS

JP     05159365 A     6/1993

(Continued)

OTHER PUBLICATIONS

Dr. Patrick Collins; "Equatorial Times No. 3"; The Newsletter of the SPS 2000 Community Around the World, Dec. 1996. Available at http://www.spacefuture.com/power/equatorialtimes/3.shtml.

(Continued)

*Primary Examiner* — William K Cheung
(74) *Attorney, Agent, or Firm* — Fletcher Yoder

(57) ABSTRACT

A thermally responsive ink composition consisting of at least one halochromic optical-state change material, at least one base, at least one solvent, and at least one binder material. The pH of the ink composition is such that the halochromic optical-state change material remains in its basic state until it is acted upon by a thermal stimulus. The ink composition is capable of transforming from a first optical state to a second optical state upon a change in pH caused by exposure to a thermal stimulus. A thermally responsive ink composition consisting of at least one quaternary onium salt of an halochromic optical-state change material, at least one solvent, and at least one binder material is also disclosed. Coating compositions prepared using these ink compositions and optical articles comprising these coating compositions are also disclosed.

27 Claims, 2 Drawing Sheets

U.S. PATENT DOCUMENTS

| | | |
|---|---|---|
| 2005/0167510 A1 | 8/2005 | Potyrailo et al. |
| 2006/0028924 A1 | 2/2006 | Atkinson |
| 2006/0234003 A1 | 10/2006 | Selinfreund |

FOREIGN PATENT DOCUMENTS

| | | |
|---|---|---|
| WO | W098/40930 A1 | 9/1998 |
| WO | W09967085 A | 12/1999 |
| WO | W02004/070718 A1 | 8/2004 |
| WO | W02007061774 A1 | 5/2007 |
| WO | W02007061974 A1 | 5/2007 |

OTHER PUBLICATIONS

WO Search Report, PCT/US2007/77230, Apr. 16, 2008.

* cited by examiner

THERMALLY RESPONSIVE INK AND COATING COMPOSITIONS

BACKGROUND

The invention includes embodiments that relate to a thermally responsive ink composition and a thermally responsive coating composition. More particularly, the invention includes embodiments that relate to a thermally responsive ink composition and a thermally responsive coating composition for use as part of an anti-theft system for optical articles.

Shoplifting is a major problem for retail venues and especially for shopping malls, where it is relatively difficult to keep an eye on each customer while they shop or move around in the store. Relatively small objects, such as CDs and DVDs are common targets as they can be easily hidden and carried out of the shops without being noticed. Shops, as well as the entertainment industry, incur monetary losses because of such instances.

Even though closed circuit surveillance cameras may be located at such places, theft still occurs. Retail products sometimes are equipped with theft-deterrent packaging. For example, clothing, CDs, audiotapes, DVDs and other high-value items are occasionally packaged along with tags that set off an alarm if the item is removed from the store without being purchased. These tags are engineered to detect and alert for shoplifting. For example, tags that are commonly used to secure against shoplifting are the Sensormatic® electronic article surveillance (EAS) tags based on acousto-magnetic technology. RFID tags are also employed to trace the items on store shelves and warehouses. Other theft-deterrent technologies currently used for optical discs include hub caps for DVD cases that lock down the disc and prevent it from being removed from the packaging until it is purchased, and "keepers" that attach to the outside of the DVD case packaging to prevent the opening of the package until it is purchased. In some cases, retailers have resorted to storing merchandise in locked glass display cases. In other stores, the DVD cases on the shelves are empty, and the buyer receives the actual disc only when purchased. Many of these approaches are unappealing because they add an additional inconvenience to the buyer or retailer, or they are not as effective at preventing theft as desired. Optical storage media, in particular, pose an additional problem in that their packaging and the sensor/anti-theft tags may be easily removed.

Therefore, there is a continued need to provide techniques and systems that can assist in reducing the incidence of, and damage caused by, stolen media.

BRIEF DESCRIPTION

Figure 1:
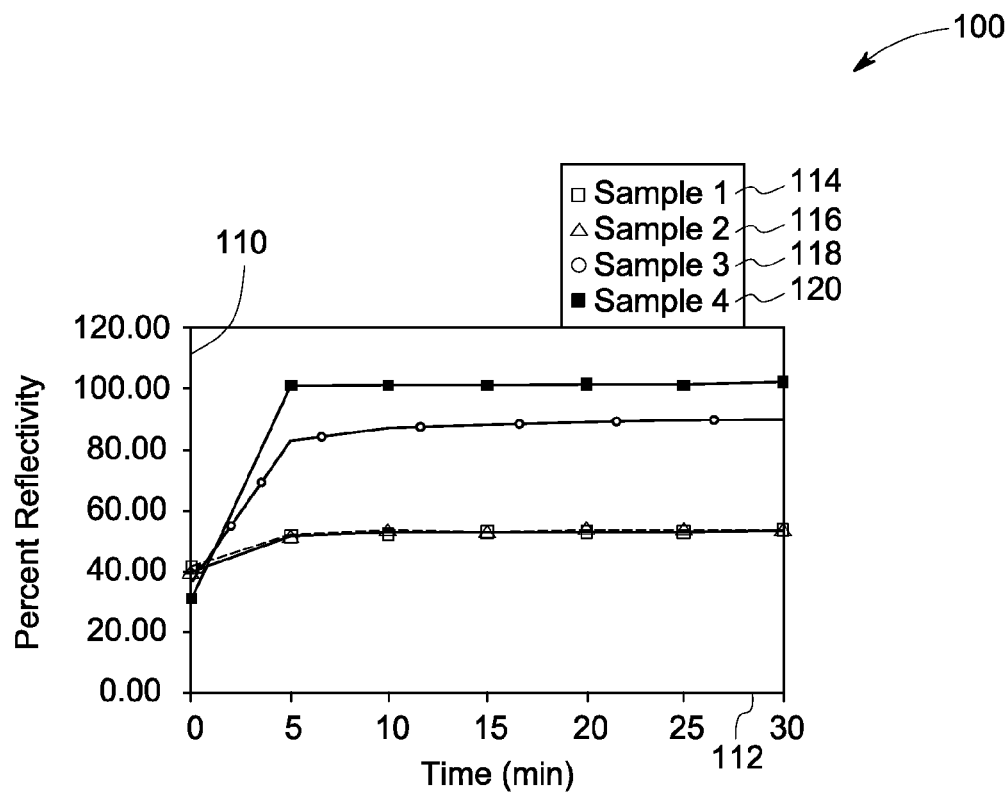
FIG. 1 illustrates the change in reflectivity of thermally responsive coating compositions prepared in accordance with embodiments described herein.

One embodiment of the invention is directed to a thermally responsive ink composition consisting of at least one halochromic optical-state change material, at least one base, at least one solvent, and at least one binder material. The pH of the ink composition is such that the halochromic optical-state change material remains in its basic state until it is acted upon by a thermal stimulus. The ink composition is capable of transforming from a first optical state to a second optical state upon a change in pH caused by exposure to a thermal stimulus.

Another embodiment of the invention is directed to a thermally responsive ink composition consisting essentially of at least one halochromic optical-state change material, at least one base, at least one solvent, and at least one binder material. The pH of the ink composition is such that the halochromic optical-state change material remains in its basic state until it is acted upon by a thermal stimulus. The ink composition is capable of transforming from a first optical state to a second optical state upon a change in pH caused by exposure to a thermal stimulus.

Another embodiment of the invention is directed to a thermally responsive coating composition consisting of at least one halochromic optical-state change material, at least one base, and at least one binder material. The pH of the coating composition is such that the halochromic optical-state change material remains in its basic state until it is acted upon by a thermal stimulus. The coating composition is capable of transforming from a first optical state to a second optical state upon a change in pH caused by exposure to a thermal stimulus. The coating composition is essentially free of a solvent.

Another embodiment of the invention is directed to a thermally responsive ink composition consisting of a quaternary onium salt of at least one halochromic optical-state change material, at least one solvent, and at least one binder material. The ink composition is capable of irreversibly transforming from a first optical state to a second optical state upon exposure to a thermal stimulus.

Another embodiment of the invention is directed to a thermally responsive coating composition consisting of a quaternary onium salt of at least one halochromic optical-state change material, and at least one binder material. The coating composition is capable of irreversibly transforming from a first optical state to a second optical state upon exposure to a thermal stimulus. The coating composition is essentially free of a solvent.

Another embodiment of the invention is directed to an article comprising a thermally responsive ink composition deposited in or deposited on the article, wherein the thermally responsive ink composition consists of at least one halochromic optical-state change material, at least one base, at least one solvent, and at least one binder material. The pH of the ink composition is such that the halochromic optical-state change material remains in its basic state. The ink composition is capable of irreversibly transforming from a first optical state to a second optical state upon exposure to a thermal stimulus.

Another embodiment of the invention is directed to an article comprising a thermally responsive ink composition deposited in or deposited on the article. The thermally responsive ink composition consists of a quaternary onium salt of at least one halochromic optical-state change material, at least one solvent, and at least one binder material. The ink composition is capable of irreversibly transforming from a first optical state to a second optical state upon exposure to a thermal stimulus.

These and other advantages and features will be more readily understood from the following detailed description of preferred embodiments of the invention that is provided in connection with the accompanying drawing.

DETAILED DESCRIPTION

One solution to this shoplifting problem, specifically for optical media articles such as DVD's, is to render at least a portion of the content of the DVD inaccessible unless the retailer at the point-of-sale (POS) has activated the DVD. One approach to rendering the content of the DVD inaccessible prior to activation is to employ a thermally responsive ink composition to deposit a thermally responsive coating composition in or on the DVD, wherein the thermally responsive coating composition at least partially absorbs the incident laser from an optical data reader so that the complete data directly in the optical path of the laser cannot be read. In this instance, the optical article has no value, and therefore there is no incentive for the shoplifter to steal it. However, upon converting the DVD to an "activated" state using an external stimulus at the point-of-sale, the thermally responsive coating composition becomes sufficiently transparent, with respect to the wavelength of the laser employed in the optical data reader, due to a change in the optical properties of the thermally responsive coating composition, and the complete data directly in the optical path of the laser can now be read by the incident laser from the optical data reader, therefore rendering the full content of the DVD accessible to a legitimate consumer.

Various embodiments of thermally responsive ink compositions, thermally responsive coating compositions, articles comprising thermally responsive coating compositions, and methods for activating the thermally responsive ink and coating compositions are described below. Aspects of the embodiments described herein can be used in combination with the materials, systems and techniques previously disclosed in U.S. patent applications Ser. Nos. 11/538,451, 11/567,271 and 11/831,180, to inhibit the theft or unauthorized use of optical articles. Thus the disclosures of U.S. patent application Ser. No. 11/538,451, filed Oct. 4, 2006, U.S. patent application Ser. No. 11/567,271, filed Dec. 6, 2006, U.S. patent application Ser. No. 11/831,180, filed Jul. 31, 2007, are hereby incorporated by reference in their entireties.

One embodiment of the invention is directed to a thermally responsive ink composition consisting of at least one halochromic optical-state change material, at least one base, at least one solvent, and at least one binder material. The pH of the ink composition is such that the halochromic optical-state change material remains in its basic state until it is acted upon by a thermal stimulus. The ink composition is capable of transforming from a first optical state to a second optical state upon a change in pH caused by exposure to a thermal stimulus.

In one embodiment, the pH of the coating is due to a change in concentration of the base within the ink composition. In one embodiment, the change in pH of the ink composition is due to a change in concentration of the base within the ink composition due to evaporation, sublimation, or degradation of the base. In one embodiment, the change in concentration of the base within the ink composition is irreversible.

The term "thermally responsive" as used herein, describes materials that undergo either a reversible or an irreversible thermally induced color change. As used herein the term "optical-state change" material is used to describe a material which is capable of existing in at least two different forms, each form possessing a unique optical state, for example a unique wavelength associated with a maximum optical absorbance within a range of from about 200 nanometers to about 800 nanometers, or a unique extinction coefficient at a specific wavelength between about 200 nanometers to about 800 nanometers.

One suitable halochromic optical-state change material that may be used in the thermally responsive ink composition is a chromic dye. As described herein the term "halochromic" describes a material which changes optical state for example, color, upon a change in pH i.e., a change in the acidity or basicity results in a change in the optical absorbance of the chromic dye. This process is also known as "acidichromism" or "halochromism". For example, the thermally responsive ink composition may contain a thermochromic dye i.e., a pH responsive dye such as for example triaryl methylene dyes, azo dyes, squarylium dyes, and their derivatives. One example of a triaryl methylene dye is the sodium salt of bromocresol green, which undergoes a change in its maximum optical absorbance from about 600 nanometers to about 650 nanometers at a pH value greater than about 7 to an optical absorbance below 450 nanometers at a pH values less than about 5. Within the scope of this disclosure the terms "pH" or "change in pH" are used to describe the acidity, basicity, or change in acidity or basicity of the thermally responsive ink composition. A decrease in the pH is a result of an increase in acidity (or decrease in basicity) and an increase in the pH is a result of a decrease in acidity (or increase in basicity). In aqueous systems, pH values less than 7 are classified as acidic and pH values greater than 7 are classified as basic.

As used herein, the term "chromic dye" describes optical-state change dyes which can exist in two different color forms between about 200 nanometers to about 800 nanometers. In one embodiment, the chromic dye is a triarylmethylene dye. In one embodiment, the halochromic dye component also may include pH sensitive dyes that are derivatives of commercially available dyes, such as derivatibes of triarylmethane dyes with functionalities on the aryl rings that include, but are not limited to, bromines, iodines, chlorines, phenyl, isopropyl, methyl, alkyl, cyano, alkyne or alkene substituents. Suitable non-limiting examples of chromic dyes include bromocresol green, bromocresol purple, bromophenol blue, bromothymol blue, thymolphthalein, thymol blue, tetrabromophenol blue, lacmoid, litmus, naphtholpthalein, naphtholbenzein, aniline blue WS, durazol blue 4R, durazol blue 8G, magenta II, mauveine, naphthalene blue black, orcein, pontamine sky blue 5B, naphthol green B, picric acid, martius yellow, naphthol yellow S, alcian yellow, fast yellow, metanil yellow, azo-eosin, xylidine ponceau, orange G, ponceau 6R, chromotrope 2R, azophloxine, lissamine fast yellow, tartrazine, amido black 10B, bismarck brown Y, congo red, congo corinth, trypan blue, Evans blue, Sudan III, Sudan IV, oil red O, Sudan black B, Biebrich scarlet, Ponceau S, woodstain scarlet, Sirius red 4B, Sirius red F3B, fast red B, fast blue B, auramine O, malachite green, fast green FCF, light green SF yellowish, pararosanilin, rosanilin, new fuchsin, Hoffman's violet, methyl violet 2B, crystal violet, Victoria blue 4R, methyl green, ethyl green, ethyl violet, acid fuchsin, water blue I, methyl blue, chrome violet CG, chromoxane cyanin R, Victoria blue R, Victoria blue B, night blue, pyronin Y, pyronin B, rhodamine B, fluorescein, eosin Y ws, ethyl eosin, eosin B, phloxine B, erythrosin B, rose bengal, Gallein, acriflavine, acridine orange, primuline, thioflavine T, thioflavine S, safranin O, neutral red, azocarmine G, azocarmine B, safranin O, gallocyanin, gallamine blue, celestine blue B, nile blue A, thionin, azure C, azure A, azure B, methylene blue, methylene green, toluidine blue O, alizarin, alizarin red S, purpurin, anthracene blue SWR, alizarin cyanin BBS, nuclear fast red, alizarin blue, Luxol fast blue MBS, alcian blue 8GX, saffron, Brazilin and Brazilein, hematoxylin and hematein, laccaic acid, Kermes, carmine, and their derivatives thereof.

In one embodiment, the amount of the halochromic optical-state change material is in a range of from about 25 weight percent to about 35 weight percent based on the weight of a coating formed using the composition. In another embodiment, the amount of the halochromic optical-state change material is in a range of from about 28 weight percent to about 32 weight percent based on the weight of a coating formed using the composition. In yet another embodiment, the amount of the halochromic optical-state change material is in a range of from about 29 weight percent to about 31 weight percent based on the weight of a coating formed using the composition.

In various embodiments, the base used herein may possess a suitable $pK_a$ and desirable physical properties, such as boiling point and vapor pressure. The primary function of the base in the formulation is to modify the initial pH of the ink and coating in a manner such that the halochromic dye is in the appropriate state (i.e., has the suitable absorption spectrum). A suitable $pK_a$ of the base is dependant on the halochromic dye used in the thermally responsive coating. It is desirable to use a base that has a larger $pK_a$ than the halochromic dye, so that the halochromic dye is present in its basic state and exhibits the absorption spectrum associated with the molecule when it is in a basic environment. For example, the $pK_a$ of bromothymol blue is 7.1 and is bromothymol blue is blue in color at pH values of greater than 8 and yellow in color at pH values lesser than 6. The addition of greater than 2 molar equivalents of dicylohexylamine ($pK_a$=11.2) to a thermally responsive ink with bromothymol blue as the dye would result in the dye displaying optical properties characteristic of the dye in its basic form (i.e., the dye is converted to a dicyclohexylammonium salt). The physical properties of the base component may be dependant on the halochromic dye that is used in the thermally responsive coating. In general, it is desired to use organic bases with moderate or low volatility (i.e., moderate to high boiling points and low vapor pressures). For example, dicylohexylamine (boiling point=261 degrees Celsius) can be used as a base in a thermally responsive coating with bromothymol blue as the halochromic dye. In general, primary, secondary or tertiary amines can be used as bases in the thermally responsive formulations. In one embodiment, the base comprises of dihexylamine, dioctylamine, dinonylamine, didecylamine, pentylamine, hexylamine, heptylamine, octylamine, nonylamine, decylamine, dodecylamine, tridecylamine, tetradecylamine, pentadecylamine, 1,8-diazabicyclo[5.4.0]undec-7-ene (DBU), 1,8-bis(dimethylamino)naphthalene, 1,4-diazabicyclo[2.2.2]octane (DABCO), 1,5,7-triazabicyclo[4.4.0]dec-5-ene (TBD), tetraethylenepentamine (TEPA), piperidine, ethanolamine, cyclohexylamine, triethylamine, diisopropylamine, pentamethylpiperidine, 1,5-diazabicyclo[4.3.0]non-5-ene (DBN), pyridine, piperidine, N,N-diisopropylethylamine, N,N-dimethylpyridine, morpholine, N,N-dimethylaniline, cyclohexylpiperazine, or a combination thereof.

In one embodiment, the amount of the base is in a range of from about 0.5 milli moles to about 4.0 milli moles based on the amount of the halochromic optical-state change material. In another embodiment, the amount of the base is in a range of from about 1.0 milli moles to about 3.0 milli moles based on the amount of the halochromic optical-state change material. In yet another embodiment, the amount of the base is in a range of from about 2.0 milli moles to about 2.5 milli moles based on the amount of the halochromic optical-state change material.

In various embodiments, the solvents used in the thermally responsive ink compositions are selected based on different parameters as discussed herein. In one embodiment, a suitable solvent may be selected to satisfy the solubility of various components in the thermally responsive ink composition including the binder material, the halochromic optical-state change material, the base, and the optional plasticizer. In another embodiment, wherein the thermally responsive ink composition is used to deposit a thermally responsive coating composition, the solubility of the different components of the thermally responsive ink composition in the solvent should be such that there will be no phase separation of the different components during the post-deposition drying step. In a further embodiment, wherein the thermally responsive ink composition is used to deposit a thermally responsive coating composition on an article suitable solvents include those that exhibit a chemical inertness towards the material used to form the article. For example if the article is an optical article such as for example a DVD made using a polycarbonate, the selected solvent(s) should not induce solubilization, crystallization, or any other form of chemical or physical attack of the polycarbonate. This is essential to preserve the readability of the data underneath the thermally responsive coating composition. In one embodiment, in the case of solvent mixtures the volume fraction of any solvent that could potentially attack the polycarbonate may be less than about 30 percent. As used herein the term "surface tension" refers to a property of the liquid that affects the spreading of a liquid on a surface. The surface tension will have a dramatic result on the final shape of a drop or multiple drops of liquid printed on solid surfaces. With respect to the ink formulations of the present disclosure, surface tension is a critical parameter for printing the ink formulations using conventional printing techniques such as, but not limited to, inkjet printing and screen printing. Surface tension is also a parameter for the jetting process itself during inkjet printing, as it will affect how drops are formed at the print-head. If the surface tension is not appropriate, inks will not be jettable with inkjet printing.

Other aspects of suitable solvents include, but are not limited to, low vapor pressure and high boiling points so that the thermally responsive ink is printable by methods known to one skilled in the art, such as for example, screen printing or ink-jet printing methods. Solvents with lower boiling points may evaporate rapidly from the ink, causing clogging of inkjet print head nozzles or drying onto a printing screen, either of which can lead to poor quality of the resultant thermally responsive coating. In one embodiment, a solvent with a boiling point above 80 degrees Celsius is employed for an inkjet printing composition. In various embodiments, the thermally responsive ink composition should be a physical mixture of the various components and there should be no reactivity between the components at least under ambient conditions.

In one embodiment, suitable solvents employed in the thermally responsive ink composition include, but are not limited to: a glycol ether solvent, an aromatic hydrocarbon solvent containing at least 7 carbon atoms, an aliphatic hydrocarbon solvent containing at least 6 carbon atoms, a halogenated solvent, an amine based solvent, an amide based solvent, an oxygenated hydrocarbon solvent, or miscible combinations thereof. Some specific suitable non-limiting examples of such solvents include diacetone alcohol (DAA), dipropylene glycol methyl ether (Dowanol DPM), propylene glycol methyl ether (Dowanol PM), butyl carbitol, ethylene glycol, glycerol with glycol ethers, cyclohexanone, and miscible combinations thereof.

In one embodiment, the amount of the solvent is in a range of from about 80 weight percent to about 90 weight percent based on the weight of the ink composition. In another embodiment, the amount of the solvent is in a range of from about 83 weight percent to about 87 weight percent based on the weight of the ink composition. In yet another embodiment, the amount of the solvent is in a range of from about 84 weight percent to about 85 weight percent based on the weight of the ink composition.

The primary function of the binder materials is to assist the adherence of a thermally responsive ink composition to the surface of an article on which the thermally responsive ink composition is deposited. Suitable non-limiting examples of binder materials include one or more of a polymer, an oligomer, a polymeric precursor, and a polymerizable monomer. Suitable non-limiting examples of polymeric materials include poly(alkenes), poly(anilines), poly(thiophenes), poly(pyrroles), poly(acetylenes), poly(dienes), poly(acrylates), poly(methacrylates), poly(vinyl ethers), poly(vinyl thioethers), poly(vinyl alcohols), poly(vinyl ketones), poly(vinyl halides), poly(vinyl nitriles), poly(vinyl esters), poly(styrenes), poly(arylenes), poly(oxides), poly(carbonates), poly(esters), poly(anhydrides), poly(urethanes), poly(sulfonates), poly(siloxanes), poly(sulfides), poly(thioesters), poly(sulfones), poly(sulfonamides), poly(amides), poly(ureas), poly(phosphazenes), poly(silanes), poly(silazanes), poly(benzoxazoles), poly(oxadiazoles), poly(benzothiazinophenothiazines), poly(benzothiazoles), poly(pyrazinoquinoxalines), poly(pyromellitimides), poly(quinoxalines), poly(benzimidazoles), poly(oxindoles), poly(oxoisoindolines), poly(dioxoisoindolines), poly(triazines), poly(pyridazines), poly(piperazines), poly(pyridines), poly(piperidines), poly(triazoles), poly(pyrazoles), poly(pyrrolidines), poly(carboranes), poly(oxabicyclononanes), poly(dibenzofurans), poly(phthalides), poly(acetals), poly(anhydrides), carbohydrates, blends of the above polymeric materials, and copolymers thereof. In one embodiment, the thermally responsive ink composition comprises a polymerizable monomer, such as an acrylate monomer (e.g., methyl methacrylate), which can be polymerized (i.e. cured) to form a thermally responsive coating after the thermally responsive ink composition has been deposited on an optical article.

In one embodiment, the amount of the binder material is in a range of from about 20 weight percent to about 60 weight percent based on a weight of a coating formed using the composition. In another embodiment, the amount of the binder material is in a range of from about 30 weight percent to about 50 weight percent based on a weight of a coating formed using the ink composition. In yet another embodiment, the amount of the binder material is in a range of about 35 weight percent to about 45 weight percent based on a weight of a coating formed using the ink composition.

As discussed above, the thermally responsive ink composition is capable of transforming from a first optical state to a second optical state upon exposure to a thermal stimulus. The change from the first optical state to the second optical state occurs due to the presence of the thermally responsive optical-state change material. In one embodiment, the thermally responsive transformation from the first optical state to the second optical state is a bistable transformation. As used herein, the term "bistable transformation" is defined as a condition where the optical state of the thermally responsive ink composition corresponds to one of two possible free energy minima and the ink composition remains in its current optical state in the absence of an external thermal stimulus above about 25 degrees Celsius. In one embodiment, the thermally responsive ink composition is transformed from the first optical state to the second optical state in a temperature range of from about 50 degrees Celsius to about 200 degrees Celsius. In another embodiment, the thermally responsive ink composition is transformed from the first optical state to the second optical state in a temperature range of from about 80 degrees Celsius to about 190 degrees Celsius. In yet another embodiment, the thermally responsive ink composition is transformed from the first optical state to the second optical state in a temperature range of from about 100 degrees Celsius to about 180 degrees Celsius.

In one embodiment, the thermally responsive ink composition has a maximum optical absorbance in a range of about 200 nanometers to about 800 nanometers. In another embodiment, the thermally responsive ink composition has a maximum optical absorbance in a range of about 300 nanometers to about 750 nanometers. In yet another embodiment, the thermally responsive ink composition has a maximum optical absorbance in a range of about 400 nanometers to about 700 nanometers. It will be appreciated that the specific wavelengths for which the absorbance of the composition is maximized may be chosen to correspond to a particular application. For instance, if the composition is intended for use with DVD systems, the choice of wavelength should desirably correspond to the wavelengths in use in DVD players.

The thermally responsive ink composition may primarily find a use in security applications. For example, if the thermally responsive ink composition is applied as a thermally responsive coating composition on a DVD, and the DVD is to be legitimately activated by a authorized store personnel at the POS, the time taken for the activation should be conveniently short. If the activation takes too much time one may find long queues at the POS. In one embodiment, the time taken for a film comprising this composition in an optical article to bleach in presence of a thermal source is less than or equal to about 6 seconds. In another embodiment, the time taken for a film comprising this composition in an optical article to bleach in presence of a thermal source is less than or equal to about 4 seconds. In yet another embodiment, the time taken for a film comprising this composition in an optical article to bleach in presence of a thermal source is less than or equal to about 2 seconds. In one embodiment, the optical reflectivity of the coating after interaction with the thermal source is in a range of about 40 percent to about 100 percent. In another embodiment, the optical reflectivity of the coating after interaction with the thermal source is in a range of about 65 percent to about 100 percent. In yet another embodiment, the optical reflectivity of the coating after interaction with the thermal source is in a range of about 90 percent to about 100 percent.

Further, as much as one would like the DVD's to be activated in a minimum time period in the presence of a legitimate thermal source, the thermally responsive coating composition should provide a long shelf life to the inactive DVD, i.e., the composition should not degrade or decompose under normal storage conditions, say for example, at a temperature of about 25 to 50 degrees Celsius in the presence of air. In one embodiment, the time taken for a coating comprising this composition in an optical article to bleach under storage at a temperature of about 25 degrees Celsius is about 3 months to about 24 months. In another embodiment, the time taken for a coating comprising this composition in an optical article to bleach under storage at a temperature of about 25 degrees Celsius is about 6 months to about 12 months. In yet another embodiment, the time taken for a coating comprising this composition in an optical article to bleach under storage at a temperature of about 25 degrees Celsius is about 8 months to about 10 months.

In one embodiment, the optical reflectivity of the coating after storage in the pre-activated state is less than or equal to about 30 percent. In another embodiment, the optical reflectivity of the coating after storage in the pre-activated state is in a range of about 10 percent to about 25 percent. In yet another embodiment, the optical reflectivity of the coating after storage in the pre-activated state is in a range of about 15 percent to about 20 percent.

In another embodiment the thermally responsive ink composition further comprises at least one plasticizer. Suitable plasticizers include include abietates, adipates, alkyl sulfonates, azelates, benzoates, citrates, epoxides, glycol ethers and their esters, glutarates, hydrocarbon oils, isobutyrates, oleates, pentaerythritol derivatives, phosphates, phthalates, ionic liquid plasticizers, and poly(caprolactone) triol. In one embodiment, the plasticisers may be selected from one or more of bis[2-(2-butoxyethoxy)ethyl]adipate, bis(3,4-epoxycyclohexylmethyl)adipate, (bis(2-ethylhexyl)phthalate, dioctyl phthalates, imidazolium salts, quaternary ammonium salts, phosphonium salts, pyrazolium salts, pyridinium salts, sulfonium salts, piperidinium salts, and morpholinium salts.

Another embodiment of the invention is directed to a thermally responsive ink composition consisting essentially of at least one halochromic optical-state change material, at least one base, at least one solvent, and at least one binder material. The pH of the ink composition is such that the halochromic optical-state change material remains in its basic state until it is acted upon by a thermal stimulus. The ink composition is capable of transforming from a first optical state to a second optical state upon a change in pH caused by exposure to a thermal stimulus.

Another embodiment of the invention is directed to a thermally responsive coating composition consisting of at least one halochromic optical-state change material, at least one base, and at least one binder material. The pH of the coating composition is such that the halochromic optical-state change material remains in its basic state until it is acted upon by a thermal stimulus. The coating composition is capable of transforming from a first optical state to a second optical state upon a change in pH caused by exposure to a thermal stimulus. The coating composition is essentially free of a solvent.

In one embodiment, the invention comprises a thermally responsive coating that undergoes a change in optical absorbance when a thermal stimulus is applied due to a change in the pH of the coating environment. The change in pH of the coating may be due to a change in concentration of the base within the coating due to evaporation, sublimation, or degradation of the base. The temperature required to cause a change in the optical absorption spectrum of the coating may be dependant on the halochromic dye, base, and the polymer used in the ink formulation. In one embodiment, the coating consists of a halochromic dye that undergoes a change in optical absorbance when the pH of the environment is altered using a thermal stimulus. For example, a coating containing the halochromic dye bromothymol blue, and the base dicyclohexylamine, has a large optical absorption band at 650 nanometers and the coating is blue in color. This color is due to the formation of a bis-dicylohexylammonium salt of bromothymol blue as a result of the acid-base reaction between the dye and bases. The bis-dicyclohexyammonium salt of bromothymol blue is in equilibrium with the mono-dicylohexylammonium salt of bromothymol blue and the neutral bromothymol blue, both of which do not significantly absorb light at 650 nanometers. Heating the thermally responsive coating may result in i) evaporation of free dicyclohexylamine in the coating or ii) a change in the equilibrium constant for the acid-base reaction, or a combination of the two events. The result is a coating that has a lower concentration of base, and hence a lower pH, which results in a change in the optical absorption of the coating.

In another embodiment, the present invention provides a thermally responsive coating composition, deposited using a thermally responsive ink composition, wherein the thermally responsive coating composition comprises at least one thermally responsive optical-state change material, at least one thermally responsive pH modifier, and at least one binder material, wherein the thermally responsive coating composition is essentially free of solvent, wherein the thermally responsive coating composition has a maximum optical absorbance in a range of from about 200 nanometers to about 800 nanometers, and wherein the thermally responsive coating composition is capable of transforming from a first optical state to a second optical state upon exposure to a thermal stimulus. In yet another embodiment, the present invention provides an article comprising the thermally responsive coating composition deposited in or deposited on the article.

As used herein, the term "coating" describes a layered film structure. In certain embodiments, the layered film structure may comprise a single layer. The terms "coating" and "film" may be used interchangeably. In one embodiment, the thickness of the coating is in a range of from about 0.1 microns to about 100 microns. In another embodiment, the thickness of the coating is in a range of from about 5 microns to about 95 microns. In yet another embodiment, the thickness of the coating is in a range of from about 10 microns to about 90 microns.

In one embodiment, the thermally responsive coating composition may be deposited on an article using the thermally responsive ink composition by employing methods known to one skilled in the art. For example, screen printing and ink-jet printing methods can be used. In one embodiment, the article is an optical article. The thermally responsive ink composition may be converted to the corresponding thermally responsive coating composition, using methods known to one skilled in the art. Exemplary methods include air drying at ambient conditions, drying under controlled temperature conditions such as for example in an oven, drying under vacuum, and the like.

As used herein, the term "essentially free of solvent" means that the thermally responsive coating composition may contain less than about 0.1 weight percent of solvent based on the total weight of the thermally responsive coating composition.

In various embodiments, the thermally responsive optical-state change material, the thermally responsive pH modifier, and the binder material, may be the same or similar to those discussed above for the thermally responsive ink composition.

In one embodiment, the thermally responsive coating composition has a maximum optical absorbance in a range of about 200 nanometers to about 800 nanometers. In another embodiment, the thermally responsive coating composition has a maximum optical absorbance in a range of about 300 nanometers to about 700 nanometers. In yet another embodiment, the thermally responsive coating composition has a maximum optical absorbance in a range of about 400 nanometers to about 650 nanometers. As discussed above, it will be appreciated that the specific wavelengths for which the absorbance of the composition is maximized may be chosen to correspond to a particular application.

Another embodiment of the invention is directed to a thermally responsive ink composition consisting of a quaternary onium salt of at least one halochromic optical-state change material, at least one solvent, and at least one binder material.

The ink composition is capable of irreversibly transforming from a first optical state to a second optical state upon exposure to a thermal stimulus. In one embodiment, the quaternary onium salt comprises one more of a quaternary ammonium salt or a quaternary phosphonium salt. Suitable examples of quaternary onium salts of a halochromic optical-state change material include bis-N-benzyl-N-phenyl-N,N-dimethylammonium salt of bromothymol blue, bis-N-benzyl-N-phenyl-N,N-dimethylammonium salt of bromocresol green, bis-N-benzyl-N-phenyl-N,N-dimethylammonium alpha-naphthophthalein, and N-benzyl-N,N,N-trimethylammonium salts of alpha-naphthophthalein.

One skilled in the art will appreciate that in embodiments where the quaternary ammonium salt of the dye is used addition of a base may not be necessary. Typically, the quaternary salt is formed by the reaction of a dye with a quaternary ammonium/phosphonium hydroxide or by exchange of an alkali metal salt of a dye with a quaternary ammonium/phosphonium salt. In the ink composition, the quaternary onium salt disassociates to provide the ammonium/phosphonium ions that provide the function of a base. In certain embodiments, a base may be added to the ink composition comprising the quaternary onium salt.

Another embodiment of the invention is directed to a thermally responsive coating composition consisting of a quaternary onium salt of at least one halochromic optical-state change material, and at least one binder material. The coating composition is capable of irreversibly transforming from a first optical state to a second optical state upon exposure to a thermal stimulus. The coating composition is essentially free of a solvent.

In various embodiments, the optional base, the solvent, and the binder material employed in the preparation of the thermally responsive ink and coating composition consisting of the quaternary onium salt of a halochromic optical-state change material may be the same as discussed above. The thermally responsive ink composition may also optionally include at least one plasticizer.

Another embodiment of the invention is directed to an article comprising a thermally responsive ink composition deposited in or deposited on the article, wherein the thermally responsive ink composition consists of at least one halochromic optical-state change material, at least one base, at least one solvent, and at least one binder material. The pH of the ink composition is such that the halochromic optical-state change material remains in its basic state. The ink composition is capable of irreversibly transforming from a first optical state to a second optical state upon exposure to a thermal stimulus.

Another embodiment of the invention is directed to an article comprising a thermally responsive ink composition deposited in or deposited on the article. The thermally responsive ink composition consists of a quaternary onium salt of at least one halochromic optical-state change material, at least one solvent, and at least one binder material. The ink composition is capable of irreversibly transforming from a first optical state to a second optical state upon exposure to a thermal stimulus.

As used herein, the term "optical article" refers to an article that includes an optical data layer for storing data. The stored data may be read by, for example, an incident laser of an optical data reader device such as a standard compact disc (CD) or digital versatile disc (DVD) drive, commonly found in most computers and home entertainment systems. In some embodiments, the optical article may include one or more data layers. Furthermore, the optical data layer may be protected by employing an outer coating, which is transparent to the incident laser light, and therefore allows the incident laser light to pass through the outer coating and reach the optical data layer. Non-limiting examples of optical articles include a compact disc (CD); a digital versatile disc (DVD); multi-layered structures, such as DVD-5 or DVD-9; multi-sided structures, such as DVD-10 or DVD-18; a high definition digital versatile disc (HD-DVD); a Blu-ray disc; a near field optical storage disc; a holographic storage medium; and a volumetric optical storage medium, such as, a multi-photon absorption storage format. In other embodiments, the optical article may also include an identification card, a passport, a payment card, a driver's license, a personal information card, or any other documents or devices, which employ an optical data layer for data storage.

In one embodiment, the thermally responsive coating composition is capable of irreversibly altering the state of functionality of the optical article. In the "pre-activated" state, at least one portion of the data from the optical data layer is unreadable by the incident laser of an optical data reader device, however, this same portion of data can be read from the optical data layer in the "activated" state of functionality.

The thermally responsive ink composition and/or the thermally responsive coating composition disclosed herein are capable of transforming from a first optical state to a second optical state upon exposure to either a direct or a remote thermal stimulus. As used herein, the term "direct" when used with respect to the application of the thermal stimulus to the thermally responsive ink composition and/or the thermally responsive coating composition refers to an embodiment wherein the thermal stimulus is in "direct" physical contact with the thermally responsive ink composition and/or thermally responsive coating composition. For example, an electrical device disposed in direct contact with the marks on the optical article may provide the activation signal when operably coupled with a POS equipment.

As used herein, the term "remote" when used with respect to the application of the thermal stimulus to the thermally responsive ink composition and/or the thermally responsive coating composition refers to an embodiment wherein the thermal stimuli is not in "direct" physical contact with the thermally responsive ink composition and/or thermally responsive coating composition. One example wherein the thermal stimuli is applied remotely to a thermally responsive coating composition is an embodiment wherein at least a portion of the thermally responsive coating composition is coated with an optically transparent second layer, which serves as a protective coating for the thermally responsive coating composition from chemical and/or physical damage, and wherein the application of the thermal stimuli to the thermally responsive coating composition is through the optically transparent second layer. Another example wherein the thermal stimuli is applied remotely to a thermally responsive coating composition is an embodiment wherein a ray of light is incident on at least a portion of the thermally responsive coating composition and the ray of light generates heat sufficient to transform the thermally responsive coating composition from a first optical state to a second optical state.

In various embodiments of the invention, the optical article comprising the thermally responsive coating composition may be transformed from a "pre-activated" state of functionality to an "activated" state of functionality. Conversion from the "pre-activated" state of functionality to the "activated" state of functionality is achieved by the activation of the thermally responsive coating composition, which is deposited in or on the optical article, such that the thermally responsive coating composition is in optical communication with the optical data layer. As used herein, the term optical communication refers to transmission and reception of light by optical devices. The thermally responsive coating composition is activated by interacting with one or more thermal stimuli, applied either directly or remotely to the thermally responsive coating composition. In one embodiment, the optical article may be activated using thermal activation methods known to one skilled in the arts. Non-limiting examples of the thermal activation methods include a wired activation method using a wired activation tag and a wireless activation method using a wirelessly-powered flexible tag which are operatively coupled to the thermally responsive coating composition. The thermally responsive coating composition is one part of an anti-theft system designed to prevent the unauthorized use of the optical article, designed to work in combination with additional components of the anti-theft system such as a removable wireless activation tag. Further details of the use of tags with optical articles as described herein can be found in U.S. patent application Ser. No. 11/567,271, filed Dec. 6, 2006.

In another embodiment, the optical article further comprises a microheater, resistor, or resistive heating element in thermal contact with the thermally responsive coating composition. Further details of the use of microheater, resistor, or resistive heating element with optical articles as described herein can be found in U.S. patent application Ser. No. 11/567,271, filed Dec. 6, 2006.

Alternatively, the heating element may be in electrical communication with the electrical circuitry located in the packaging of the optical article. In one embodiment, the electrical circuitry may draw upon a source for electrical energy such as a battery or charged capacitor in the packaging. At the POS the electrical circuitry in the packaging may then form electrical connections with the activation source, thereby providing the electrical energy for heating the thermally responsive coating. In certain embodiments, the packaging and/or tag comprises a battery configured to supply electrical energy to the thermally responsive coating, wherein the battery is stimulated by the external stimulus. In these embodiments, the battery is not directly stimulated by the external stimulus, but rather provides power to heat the thermally responsive layer when the RF circuit is externally stimulated As used herein, the term "pre-activated" state of functionality refers to a state of functionality of the optical article where the thermally responsive coating composition has not yet been exposed to one or more external stimuli, while the "activated" state refers to a state of functionality where the thermally responsive coating composition has been exposed to the external stimuli. In one embodiment, the "pre-activated" state comprises at least one thermally responsive coating composition which inhibits portions of the optical data layer that are located directly in the optical path of the incident laser of an optical data reader from being read. The activated state comprises a state of the optical article where the optical data layer can be read by the optical data reader as a result of the article being exposed to at least one external stimulus.

In another embodiment, the at least one thermally responsive coating composition is at least partially transparent to the incident laser of an optical data reader in the pre-activated state, allowing the data on the optical layer located directly in the optical path of the laser to be read. In this embodiment, the thermally responsive coating composition at least partially absorbs the laser from the optical data reader in the activated state and prevents the data directly in the optical path of the laser from being read.

The change in the optical properties of the thermally responsive coating composition upon activation can occur using at least two approaches. In the first approach, the thermally responsive coating composition at least partially absorbs the incident laser from an optical data reader in the "pre-activated" state, and the data directly in the optical path of the laser cannot be read. In this instance, the content stored in the optical article below the thermally responsive coating is unreadable by the optical article player. Upon converting the optical article to the "activated" state using an external stimulus, the thermally responsive coating composition is at least partially transparent to the incident laser from an optical data reader, the data directly in the optical path of the laser can be read, and the content below the thermally responsive optical coating is readable by the player. With the first approach, one may target specific areas on the disc that, when unreadable, prevent startup of the entire disc, such as the lead-in area. Thus, although the entire disc is not coated, the disc will be unplayable when the thermally responsive coating is in the "pre-activated" state. Alternatively, one may target specific areas on the disc, movie chapters, etc, to reversibly de-activate with the thermally responsive coating.

A second approach requires an additional "authoring" component, which allows the disc to be playable or unplayable, depending on whether portions of the data on the optical data layer can be read by the incident laser from an optical data reader. An explanation of the term "authoring" as it relates to an optical article, such as a DVD, can be found in "DVD Authoring and Production", by Ralph LaBarge, CMP Books, 2001. In one example of the second approach, the thermally responsive coating composition is at least partially transparent to the incident laser from an optical data reader in the "pre-activated" state, and the data directly in the optical path of the laser can be read. In this instance, the optical article is "authored" unplayable. Upon converting the optical article to the "activated" state using an external stimulus, the incident laser from the optical data reader thermally responsive coating composition is at least partially absorbed by thermally responsive coating composition, the data directly in the optical path of the laser cannot be read, and the disc is "authored" playable. Further details of the use of authoring methods with optical articles as described herein can be found in U.S. patent application Ser. No. 12/059466, filed Mar. 31, 2008.

In one embodiment the term "damaged" state refers to a state of functionality of the optical article where the optical article has undergone a physical modification such as, but not limited to, a scratch, a dimple, or a physical modification in or on the optical article. The "damaged" state may be a result of improper activation of one or more optical-state change materials in or on the optical article. In the "damaged" state at least a portion of the optical data layer cannot be read by the laser of an optical data reader as a result of significant absorbance of the laser by at least a portion of at least one thermally responsive optical-state change material. In contrast to the "activated" state, where all the thermally responsive coating composition is sufficiently transparent to the laser from the optical data reader, in the "damaged" state at least a portion of the thermally responsive coating composition absorbs at least a portion of the wavelength of the incident laser from the optical data reader and prevents the data directly in the optical path of the laser from being read.

In various embodiments, the article comprises one or more spots of the thermally responsive coating composition wherein the spots have a first surface and a second surface. In embodiments where two or more spots are employed, each of the spots may be located at a unique location on the article, designed to function in concert as part of the anti-theft system. In one embodiment, at least two spots are in direct physical contact with each other, (i.e., juxtaposed next to each other). Suitable examples of two spots in direct physical contact include, but are not limited to, concentric lines, concentric arcs, concentric spots, patterned lines, patterned arcs, patterned spots, lines or arcs which are positioned end-to-end, or any combination thereof. In one embodiment, the article comprises at least two spots, wherein at least one spot is not transparent to the incident laser of an optical data reader in the "pre-activated" state. If the article is converted from the "pre-activated" state to the "damaged" state as a result of improper activation, the optical properties of each of the spots are designed to change irreversibly such that at least a portion of at least one of the spots absorbs the laser from the optical data reader, and prevents the data directly in the optical path of the laser from being read.

Upon interaction with one or more external stimuli, the optical absorbance of the thermally responsive coating composition may be altered to change the functionality of the optical article from the pre-activated state to the activated state. For example, in the pre-activated state, the thermally responsive coating composition may render the optical article unreadable by absorbing a portion of the wavelength from the incident laser of an optical data reader. However, upon interaction with an external stimulus the thermally responsive coating composition becomes transparent to the wavelength of the laser used to read the optical article, thereby making the portion of the optical data layer which is located directly in the optical path of the laser from the optical data reader readable in the activated state. Suitable examples of external stimuli which can generate a thermal stimulus may include a laser, infrared radiation, thermal energy, X-rays, gamma rays, microwaves, visible light, ultraviolet light, ultrasound waves, radio frequency waves, microwaves, electrical energy, chemical energy, magnetic energy, or combinations thereof which generate a thermal stimulus. The interaction of the external stimulus with the optical article may include continuous, discontinuous, or pulsed forms of the external stimulus.

Alternatively, instead of being deposited on the surface of the optical article, the thermally responsive coating composition may be deposited inside the structure of the optical article. In optical storage articles, the thermally responsive coating composition may be deposited in the substrate on which the optical data layer is deposited. In such an embodiment, the thermally responsive coating composition may be mixed with the substrate material of the optical article. In alternate embodiments, the thermally responsive coating composition may be deposited between the layers of the optical article, or may be deposited within the layers of the optical article. For example, the thermally responsive coating composition may be incorporated in the UV curable adhesive of the bonding (spacer) layer. It should be appreciated that these thermally responsive coating compositions should be thermally stable to withstand the molding temperatures of the optical article. Also, these thermally responsive coating compositions may preferably absorb the wavelength of the laser in one of the activated, or the pre-activated state of the optical article. Upon interaction with external stimulus, the thermally responsive coating composition present inside the substrate changes color. As a result, the substrate may become transparent to the laser light, thereby facilitating the transmittance of laser light through the substrate and making the optical article readable.

In some embodiments, at least a portion of the thermally responsive coating composition is coated with an optically transparent second layer. The optically transparent second layer serves as a protective coating for the thermally responsive coating composition from chemical and/or physical damage. The optically transparent second layer may contain cross-linkable materials that can be cured using ultraviolet (UV) light or heat. Furthermore, the optically transparent second layer may be a scratch resistant coating. For example, the optically transparent second layer may include, but is not limited to, a matrix consisting of cross-linkable acrylates, silicones, and nano or micron silicate particles. Suitable examples of an optically transparent second layer can be found in U.S. Pat. No. 5,990,188.

EXAMPLES

Example 1

Provides Thermally Responsive Ink Compositions, Thermally Responsive Coating Compositions, and a Method for Preparing the Same Sample 1, Sample 2, Sample 3 and Sample 4 were prepared in Example 1. The general method employed in preparing Sample 2 is provided below. 1.8 grams (g) of a 10 weight percent stock solution of poly(methyl methacrylate) (Mw=15K, CAS 9011-14-7, Aldrich) in a 50:50 (weight by weight) mixture of Dowanol DPM (dipropylene glycol methyl ether, CAS 34590-94-8, Aldrich) and diacetone alcohol (DAA, 4-hydroxy-4-methyl-2-pentanone, CAS 123-42-2, Aldrich) was added to a 4 dram vial equipped with a stirbar. An additional 1.27 g of a 50:50 (weight by weight) of DPM and DAA was added to the vial. Bromothymol blue (BTB, CAS 76-59-5, Aldrich) (0.145 g, 0.232 millimoles (mmol)) was added and stirred at room temperature of about 25 degrees Celsius until it completely dissolved to give a mixture that was orange in color. To this mixture was added a 0.211 g of a 50 weight percent stock solution of dicyclohexylamine (DCHA, CAS 101-83-6, Aldrich) (0.211 g, 0.581 mmol) in 50:50 (weight by weight) of DPM and DAA. To the resultant mixture was added 0.2 g of a 10 weight percent stock solution of dioctyl phthalate of (DOP, CAS 117-81-7, Fluka) (0.20 g) in 50:50 (weight by weight) of DPM and DAA. The resultant mixture was stirred to give a mixture that was dark blue in color. Samples 1, 3 and 4 were prepared in a similar manner. The amount of the reagents used in Samples 1 to 4 in Example 1 are provided in Table 1 below.

Table 1: Composition of the ink formulations prepared using poly(methyl methacrylate) (PMMA), bromothymol blue (BTB), dicyclohexylamine (DCHA), dioctyl phthalate (DOP), Dowanol DPM (DPM) and diacetone alcohol (DAA).

TABLE 1

| | Sample 1 | | | Sample 2 | | | Sample 3 | | | Sample 4 | | |
|---|---|---|---|---|---|---|---|---|---|---|---|---|
| Chemical | Amount in Grams | Weight percent in ink | Weight percent in film | Amount in Grams | Weight percent in ink | Weight percent in film | Amount in Grams | Weight percent in ink | Weight percent in film | Amount in Grams | Weight percent in ink | Weight percent in film |
| PMMA | 0.2 | 5.5 | 44.4 | 0.18 | 5.2 | 40.0 | 0.16 | 4.9 | 35.6 | 0.14 | 4.5 | 31.1 |
| BTB | 0.145 | 4.0 | 32.2 | 0.145 | 4.2 | 32.2 | 0.146 | 4.4 | 3.2 | 0.145 | 4.7 | 32.2 |

TABLE 1-continued

| Chemical | Sample 1 | | | Sample 2 | | | Sample 3 | | | Sample 4 | | |
|---|---|---|---|---|---|---|---|---|---|---|---|---|
| | Amount in Grams | Weight percent in ink | Weight percent in film | Amount in Grams | Weight percent in ink | Weight percent in film | Amount in Grams | Weight percent in ink | Weight percent in film | Amount in Grams | Weight percent in ink | Weight percent in film |
| DCHA | 0.105 | 2.9 | 23.3 | 0.105 | 3.0 | 23.3 | 0.105 | 3.2 | 23.3 | 0.105 | 3.4 | 23.3 |
| DOP | 0 | 0 | 0 | 0.02 | 0.6 | 4.4 | 0.04 | 1.2 | 8.9 | 0.06 | 1.9 | 13.3 |
| DPM/DAA | 3.18 | 87.6 | 0 | 3 | 87.0 | 0 | 2.82 | 86.2 | 0 | 2.64 | 85.4 | 0 |
| Total | 3.53 | 100 | 100 | 3.45 | 100 | 100 | 3.27 | 100 | 100 | | 100 | 100 |

The thermally responsive coatings prepared using the thermally responsive ink compositions of Samples 1 to 4 of Example 1 are described below. The thermally responsive coatings were prepared by independently spin coating about 250 microliters of the ink compositions of Sample 1 to 4 of Example 1 onto a DVD disc at 2000 RPM for 30 seconds to produce a deep blue coating having a thickness of about <1 micrometer. The coating was allowed to dry at room temperature (about 25 degrees Celsius) in the absence of light for about 16 hours to give dark blue films. The coating was then placed in an oven and heated to a temperature of about 100° C. The coatings were monitored for the percent reflectivity at 5 minute intervals using a fiber optic Ultraviolet-visible spectrometer (Ocean Optics Inc.) in reflectance mode. The percent reflectivity of the thermally responsive coating, was measured at 650 nanometers. The percent reflectivity at 650 nanometers before and after heating for 5 replicate measurements are listed in Table 2 below.

TABLE 2

| | Percent Reflectivity at 650 nanometers | | | | | | |
|---|---|---|---|---|---|---|---|
| Sam-ples | Before Heating | After heating Time in minutes | | | | | |
| | | 5 | 10 | 15 | 20 | 25 | 30 |
| 1 | 41.16 | 51.89 | 52.55 | 52.73 | 52.93 | 52.77 | 53.63 |
| 2 | 39.54 | 51.68 | 52.92 | 52.73 | 53.29 | 53.87 | 53.81 |
| 3 | 37.28 | 83.38 | 87.23 | 88.02 | 89.05 | 89.46 | 90.21 |
| 4 | 30.94 | 101.19 | 101.29 | 101.10 | 101.99 | 101.50 | 102.29 |

Referring to FIG. 1 the change in percent reflectivity of the thermally responsive coating compositions on heating an optical article is illustrated 100. The percent reflectivity values in Table 2 were plotted on the Y-axis 110 versus time on the X-axis 112. The curves shown in FIG. 1, 114 for Sample 1, 116 for Sample 2, 118 for Sample 3, and 120 for Sample 4, show that there is an increase in the change in percent reflectivity with increasing concentrations of plasticizer added. The film formed using the ink composition prepared in Sample 4 containing 13.3 weight percent of DOP is fully bleached after 5 minutes in the oven at 100 degrees Celsius.

Figure 2:
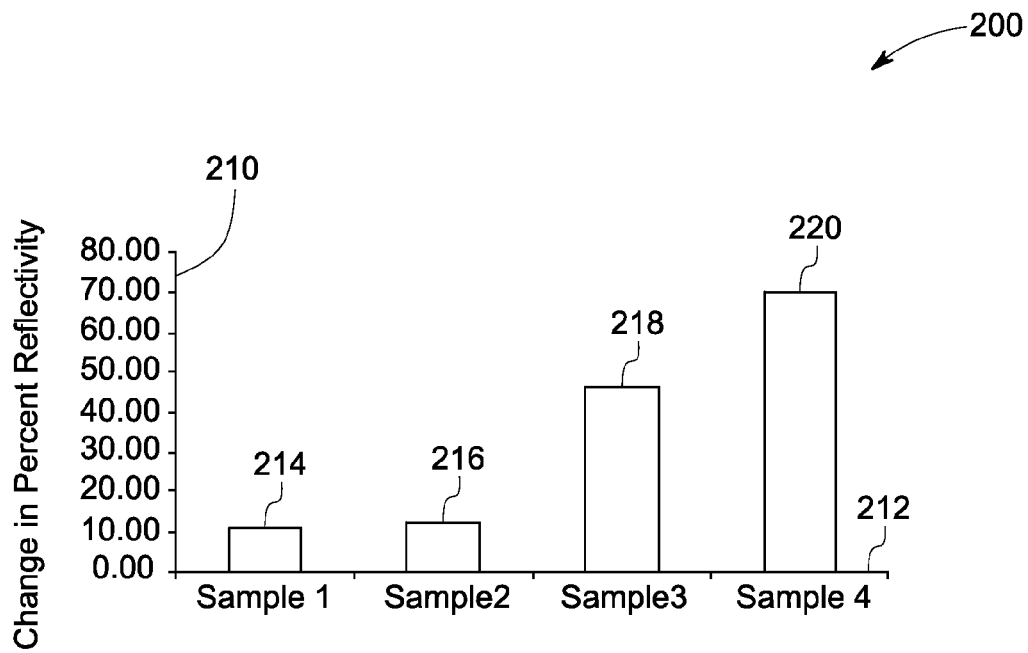
FIG. 2 illustrates the change in reflectivity of thermally responsive coating compositions prepared in accordance with embodiments described herein.

Referring to FIG. 2 the change in percent reflectivity of the thermally responsive coating compositions on heating at a temperature of about 100 degrees Celsius for 5 minutes is illustrated in the form of a bar chart 200 with change in percent reflectivity plotted on the Y-axis 210 and the sample indicated in the X-axis 212. The bars 214 for Sample 1, 216 for Sample 2, 218 for Sample 3, and 220 for Sample 4 indicate the change in percent reflectivity after heating for 5 min at 100 degrees Celsius. Change in percent reflectivity of Sample 4 is the highest when compared o the change in the percent reflectivity of Samples 1 to 3 indicating that the change is dependent on the concentrations of plasticizer added.

Example 2

Provides Thermally Responsive Ink Compositions, Thermally Responsive Coating Compositions, and a Method for Preparing the Ink and the Coating Compositions Sample 1, Sample 2, Sample 3 and Sample 4 were prepared in Example 2. The general method employed in preparing Sample 2 is provided below. 1.197 g of a 15 weight percent stock solution of poly(methyl methacrylate) (Mw=15K, CAS 9011-14-7, Aldrich) in Dowanol PM (propylene glycol methyl ether, CAS 107-98-2, Aldrich) was added to a 4 dram vial equipped with a stirbar. An additional 0.342 g of Dowanol PM and 1.578 g of diacetone alcohol was added to the vial. Bromothymol blue (0.145 g, 0.232 mmol) was added and stirred at room temperature until it completely dissolved to give a orange colored mixture. To this mixture was added 0.211 g of a 50 weight percent stock solution of DCHA (0.581 mmol) in Dowanol PM followed by 0.20 g of a 10 weight percent stock solution of DOP in Dowanol PM. The resultant mixture was stirred to give a mixture that was dark blue in color. Samples 1, 3 and 4 were prepared in a similar manner. The amount of the reagents used in Samples 1 to 4 of Example 2, are provided in Table 3 below.

TABLE 3

| Chemical | Sample 1 | | | Sample 2 | | | Sample 3 | | | Sample 4 | | |
|---|---|---|---|---|---|---|---|---|---|---|---|---|
| | Amount in Grams | Weight percent in ink | Weight percent in film | Amount in Grams | Weight percent in ink | Weight percent in film | Amount in Grams | Weight percent in ink | Weight percent in film | Amount in Grams | Weight percent in ink | Weight percent in film |
| PMMA | 0.2 | 5.5 | 44.4 | 0.18 | 5.2 | 40.0 | 0.17 | 4.9 | 37.8 | 0.16 | 4.7 | 35.6 |
| BTB | 0.145 | 4.0 | 32.2 | 0.145 | 4.2 | 32.2 | 0.145 | 4.2 | 3.2.2 | 0.145 | 4.3 | 32.2 |
| DCHA | 0.105 | 2.9 | 232.3 | 0.105 | 3.0 | 23.3 | 0.105 | 3.1 | 23.3 | 0.105 | 3.1 | 23.3 |
| DOP | 0 | 0 | 0 | 0.02 | 0.6 | 4.4 | 0.03 | 0.9 | 6.7 | 0.04 | 1.2 | 8.9 |
| PM | 1.578 | 43.8 | 0 | 1.46 | 41.8 | 0 | 1.41 | 41.0 | 0 | 1.354 | 40.0 | 0 |
| DAA | 1.578 | 43.8 | 0 | 1.58 | 45.3 | | 1.58 | 45.9 | | 1.578 | 46.7 | 0 |
| Total | 3.606 | 100 | 100 | 3.49 | 100 | 100 | 3.44 | 100 | 100 | 3.382 | 100 | 100 |

The thermally responsive coatings prepared using the thermally responsive ink compositions of Samples 1 to 4 of Example 2 are described below. The thermally responsive coatings were prepared by independently spin coating about 250 microliters of the ink compositions of sample 1 to 4 of Example 2 onto a DVD disc at 2000 RPM for about 30 seconds to produce a deep blue coating having a thickness of about <1 micrometer. The coating was allowed to dry at room temperature (about 25 degrees Celsius) in the absence of light for about 16 hours to give dark blue films. The coating was then placed in an oven and heated to a temperature of about 100 degrees Celsius. The coatings were monitored for the percent reflectivity at 5 minute intervals using a fiber optic Ultraviolet-visible spectrometer (Ocean Optics Inc.) in reflectance mode. The percent reflectivity of the thermally responsive coating was measured at 650 nanometers. The percent reflectivity at 650 nanometers before and after heating for 5 replicate measurements are listed in Table 4 below. Coatings corresponding to ink compositions Sample 1 to 4 of Example 2 started with a very low initial percentage reflectivity at 650 nanometers (about 8 percent at t=0 min). Upon heating at 100 degrees Celsius in an oven for about 5 minutes, the film from Sample 4 underwent a large change in reflectivity from 8 percent to 64 percent, indicating it had the fastest bleaching rates of all the films.

TABLE 4

| | Percent Reflectivity at 650 nanometers | | | | | | |
|---|---|---|---|---|---|---|---|
| | Before | After heating-Time in minutes | | | | | |
| Example 2 | Heating | 5 | 10 | 15 | 20 | 25 | 30 |
| Sample 1 | 37.58 | 50.47 | 50 | 50.00 | 50.20 | 50.10 | 51.48 |
| Sample 2 | 7.89 | 21.72 | 23.19 | 24.11 | 24.75 | 25.82 | 25.68 |
| Sample 3 | 7.99 | 30.40 | 33.71 | 36.01 | 38.15 | 39.90 | 40.70 |
| Sample 4 | 8.66 | 63.72 | 73.47 | 76.19 | 78.64 | 79.94 | 80.81 |

Figure 3:
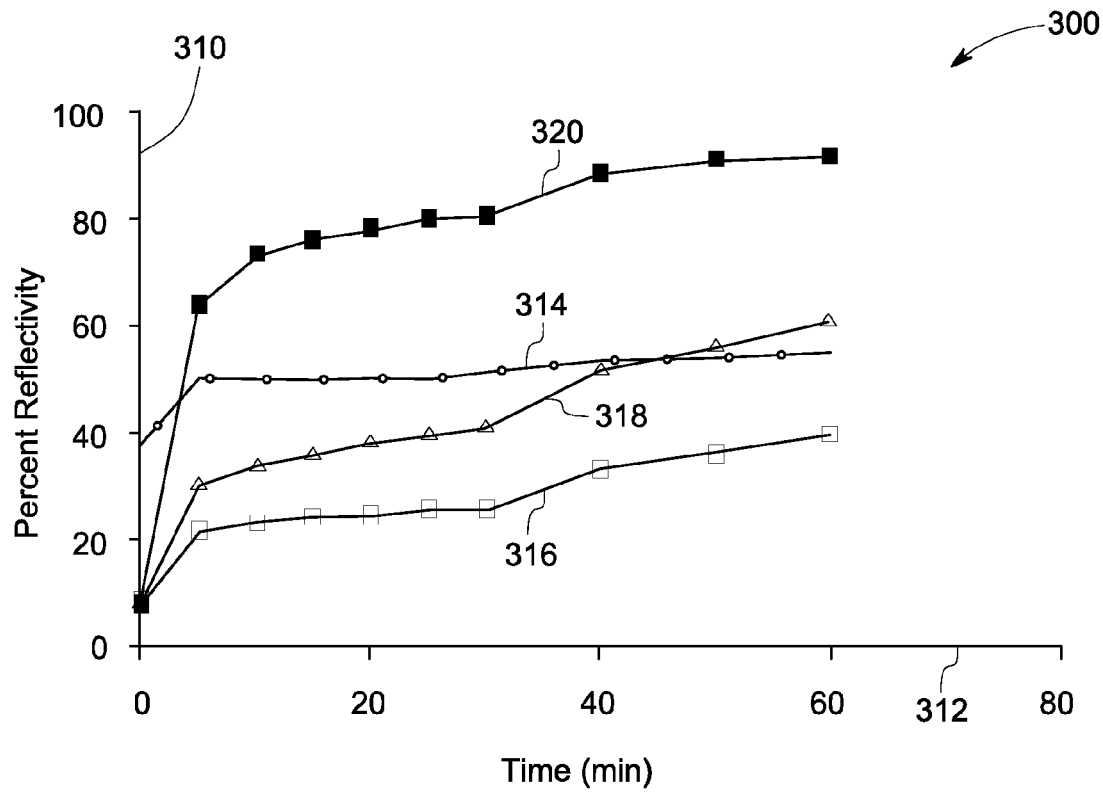
FIG. 3 illustrates the change in reflectivity of thermally responsive coating compositions prepared in accordance with embodiments described herein.

Referring to FIG. 3 the change in percent reflectivity of the thermally responsive coating compositions (of Sample 1 to 4 of Example 2) on heating an optical article is illustrated 300. The percent reflectivity values in Table 4 were plotted on the Y-Axis 310 versus time on the X-Axis 312. The curves in FIG. 3 314 for Sample 1, 316 for Sample 2, 318 for Sample 3 and 320 for Sample 4, show that the thermally responsive films undergo a change in percent reflectivity at 650 nanometers upon heating in an oven at 100 degrees Celsius. Again, there is an increase in the change in percent reflectivity as the concentration of plasticizer in the ink composition is increased.

Example 3

Provides a Thermally Responsive Ink Composition, a Thermally Responsive Ink Coating, and a Method for Preparing the Ink and the Coating 2.4 g of a 10 weight percent stock solution of poly(methyl methacrylate) (Mw=15K, CAS 9011-14-7, Aldrich) in a 50:50 (weight by weight) mixture of Dowanol DPM and DAA was added to a 4 dram vial equipped with a stirbar. An additional 3.26 g of a 50:50 (weight by weight) of DPM and DAA was added to the vial. 0.217 g bromothymol blue was added and stirred at room temperature of about 25 degrees Celsius until it completely dissolved to give a mixture that was orange in color. To this mixture was added 0.316 grams of a 50 weight percent stock solution of DCHA in 50:50 (weight by weight) DPM and DAA solvent mixture. To the resultant mixture was added 0.4 g of a 15 weight percent stock solution of DOP in 50:50 (weight by weight) of DPM and DAA solvent mixture. The resultant mixture was stirred to give a mixture that was dark blue in color. The thermally responsive ink was inkjet printed onto the surface of a DVD to produce a film with dimensions of about 3 millimeter×0.9 micrometer×0.4 micrometer. The percent reflectivity of the film at 650 nanometers was about 22 percent (measured as described above). The film was heated using a resistive heater of dimensions of approximately 5 millimeters×3 millimeters printed on a 2 mil PET substrate. The heater was printed using carbon ink (DuPont 7102) with leads to the heaters printed using a silver ink (InkTec). The sheet resistivity of the carbon and silver inks was 50±1.3 ohm per square and 0.011±0.0004 ohm per square, respectively. The heater was powered with activation device delivering 0.92 Watts for 1 second followed by 0.67 Watts for 1 second. The percent reflectivity of the film after heating at 650 nanometers was about 80 percent.

Example 4

Provides Thermally Responsive Ink Compositions, Thermally Responsive Coating Compositions, and a Method for Preparing the Ink and the Coating Compositions, Containing Different Bases and Studies the Effect of Different Bases Sample 1, Sample 2, Sample 3 and Sample 4 were prepared in Example 4. The general method employed in preparing Sample 1 is provided below. 1.067 g of a 15 wt % stock solution of poly(methyl methacrylate) (Mw=15K, CAS 9011-14-7, Aldrich) in Dowanol PM was added to a 4 dram vial equipped with a stirbar. An additional 0.342 g of Dowanol PM and 1.581 g of DAA was added to the vial. Bromothymol blue (0.145 g, 0.232 mmol) was added and stirred at room temperature until it completely dissolved to give a mixture that was orange in color. To this mixture was added 0.211 g of a 50 weight percent stock solution of DCHA in Dowanol PM followed by 0.276 g of a 10 weight percent stock solution of DOP in Dowanol PM. The resultant mixture was stirred to give a mixture that was dark blue in color. In Samples 1 to 4 of Example 4, the bases used had similar $pK_a$'s, but different boiling points. The bases that were tested were Sample 1—dicyclohexylamine (DCHA, BP 256° C.), Sample 2—dioctylamine (DiOA, BP 297° C.), Sample 3—dinonylamine (DiNA), and Sample 4—didecylamine (DiDA, BP 370° C.). The ink compositions of Samples 1 to 4 of Example 4 are included in Tables 5-8 given below.

TABLE 5

| | Sample 1 | | |
|---|---|---|---|
| Chemical | Amount in Grams | Weight percent in ink | Weight percent in film |
| PMMA | 0.16 | 4.4 | 35.6 |
| BTB | 0.145 | 4.0 | 32.2 |
| DCHA | 0.105 | 32.9 | 23.3 |
| DOP | 0.04 | 1.1 | 8.9 |
| PM/DAA | 3.16 | 87.5 | 0 |
| Total | 3.61 | 100 | 100 |

TABLE 6

Sample 2

| Chemical | Amount in Grams | Weight percent in ink | Weight percent in film |
|---|---|---|---|
| PMMA | 0.16 | 4.2 | 33/0 |
| BTB | 0.145 | 4.0 | 29.9 |
| DiOA | 0.14 | 3.9 | 28.9 |
| DOP | 0.04 | 1.1 | 8.2 |
| PM/DAA | 3.15 | 86.7 | 0 |
| Total | 3.45 | 100 | 100 |

TABLE 7

Sample 3

| Chemical | Amount in Grams | Weight percent in ink | Weight percent in film |
|---|---|---|---|
| PMMA | 0.16 | .4.4 | 31.9 |
| BTB | 0.145 | 4.0 | 28.9 |
| DiNA | 0.156 | 4.3 | 31.1 |
| DOP | 0.04 | 1.1 | 8.0 |
| PM/DAA | 3.12 | 86.2 | 0 |
| Total | 3.45 | 100 | 100 |

TABLE 8

Sample 4

| Chemical | Amount in Grams | Weight percent in ink | Weight percent in film |
|---|---|---|---|
| PMMA | 0.16 | 4.4 | 30.9 |
| BTB | 0.145 | 4.0 | 28.0 |
| DiDA | 0.173 | 34.8 | 33.4 |
| DOP | 0.04 | 1.1 | 7.7 |
| PM/DAA | 3.11 | 85.7 | 0 |

The thermally responsive coatings prepared using the thermally responsive ink compositions of Samples 1 to 4 of Example 1 are described below. The thermally responsive coatings were prepared by independently spin coating a 250 microliters sample of the ink compositions of sample 1 to 4 of Example 4 onto a DVD disc at 2000 RPM for 30 seconds to produce a deep blue coating having a thickness of about <1 micrometer. The coating was allowed to dry at room temperature (about 25 degrees Celsius) in the absence of light for about 16 hours to give dark blue films. The coating was then placed in an oven and heated to a temperature of about 100 degrees Celsius. The coatings were monitored for the percent reflectivity at 5, 10 and 30 minute intervals using a Ultraviolet-visible spectrometer (Ocean Optics Inc., USB200 fiber optic spectrometer) in reflectance mode. The absorbance of the thermally responsive coating, was measured at 650 nanometers. The change in absorbance at 650 nanometers before and after heating for 5 replicate measurements are listed in Table 9 below.

TABLE 9

| Example 4 | Change in Absorbance at 650 nanometers after heating for - time in minutes | | |
|---|---|---|---|
| | 5 | 10 | 30 |
| Sample 1 | 0.817 | 0.903 | 0.981 |
| Sample 2 | 0.559 | 0.584 | 0.594 |
| Sample 3 | 0.182 | 0.404 | 0.600 |
| Sample 4 | −0.018 | −0.014 | 0.306 |

Figure 4:
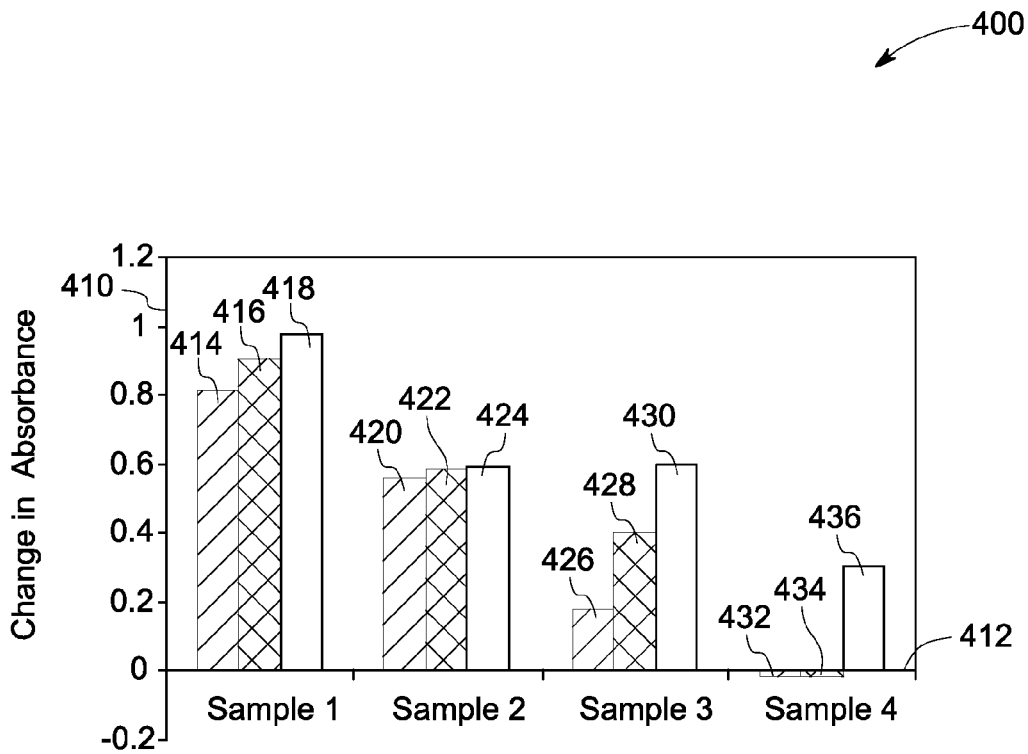
FIG. 4 illustrates the change in absorbance of thermally responsive coating compositions prepared in accordance with embodiments described.

Referring to FIG. 4 the change in absorbance of the thermally responsive coating compositions (Samples 1 to 4 of Example 4) on heating an optical article is illustrated 400. The change in absorbance values in Table 9 were plotted on the Y-axis 410 versus time on the X-axis 412. The percentage reflectivity was measured at 5 minutes, 10 minutes and 30 minutes for Samples 1 to 4 of Example 4 at a temperature of about 100 degrees Celsius. Table 10 below includes the reference numerals for the corresponding bars in the bar chart.

TABLE 10

| Reference Numeral | Sample | Time in minutes at 100 degrees Celsius |
|---|---|---|
| 414 | 1 | 5 |
| 416 | 1 | 10 |
| 418 | 1 | 30 |
| 420 | 2 | 5 |
| 422 | 2 | 10 |
| 424 | 2 | 30 |
| 426 | 3 | 5 |
| 428 | 3 | 10 |
| 430 | 3 | 30 |
| 432 | 4 | 5 |
| 434 | 4 | 10 |
| 436 | 4 | 30 |

The FIG. 4 shows that there is a decrease in the change in absorbance of the thermally responsive films as the boiling point of the base increases. Based on the results it appears that the coatings containing the bases with higher boiling points bleach more slowly than the coatings with bases with lower boiling points.

Example 5

Preparation and Decomposition of the bis-N-benzyl-N-phenyl-N,N-dimethylammonium Salt of Bromothymol Blue Preparation To a solution of the disodium salt of bromothymol blue, (100 milligrams (mg, 0.15 mmol) in 50 milliliters of methanol) was added a solution of N-benzyl-N-phenyl-N,N-dimethylammonium chloride, 74 mg (0.300) in 50 milliliters (ml) methanol. After about 2-5 seconds sodium chloride precipitated out from the solution. The resultant mixture was filtered.

Decomposition

Methanol was removed from 10 milliliters of the solution to leave 65 mg of an oily solid (estimate 30 mg of dye). The material was dissolved in 150 mg of diacetone alcohol and 150 mg of Dowanol DPM. This solution was added to 300 mg of 10% by weight poly(methyl methacrylate) (37,000 mw) in a 50:50 mixture of diacetone alcohol and Dowanol DPM. The formulation was spin coated on a DVD and the coating showed an initial reflectivity of 14 percent at 650 nanometers when measured using an Ocean Optics model USB2000 spectrophotometer with an Ocean Optics LS-1 tungsten visible light source. After heating for about 5 minutes at 100 degrees Celsius, the reflectivity increased to 37 percent at 650 nanometers and about 84 percent after 15 minutes.

Example 6

Provides the Preparation and Decomposition of the bis-N-benzyl-N-phenyl-N,N-dimethylammonium Salt of Bromocresol Green Preparation Example 6 was carried out in a manner similar to that described in Example 5. The disodium salt of bromocresol green, 742 mg (1.0 mmol)) was dissolved in 75 ml of methanol. A solution of N-benzyl-N-phenyl-N,N-dimethylammonium chloride, 498 mg (2.01 mmol) in 15 ml of methanol was added and the mixture was stirred at room temperature for 5 minutes then filtered through Celite to remove precipitated NaCl. Removal of solvent on a rotary evaporator afforded 1.19 g of the bis-N-benzyl-N-phenyl-N,N-dimethylammonium salt of bromocresol green as a blue solid.

Decomposition

A dilute methanolic solution of the blue bis-N-benzyl-N-phenyl-N,N-dimethylammonium salt of bromocresol green was heated in a vial using a heat gun. When the methanol evaporated a blue film of the dye-quaternary salt remained. Continued heating of the film caused the color to change from blue to green and finally to yellow.

Examples 7 and 8

Provides the Preparation and Decomposition of bis-N-benzyl-N-phenyl-N,N-dimethylammonium and N-benzyl-N,N,N-trimethylammonium Salts of Alpha-naphthophthalein Preparation Example 7 was carried out in a similar manner as described in Example 6 above. The bis-N-benzyl-N-phenyl-N,N-dimethylammonium salt of naphthophthalein was prepared by co-dissolving the disodium salt of naphthophthalein, 462 mg (1.0 mmol) and N,N-dimethyl-N-phenyl-N-benzylammonium chloride, 0.500 g (2.02 mmol) in methanol (60 ml). After 5 minutes the dark blue solution was filtered through Celite and the filtrate was stripped of solvent on a rotary evaporator. The residue was isolated as a solid. $^1$H NMR of the salt in deuterated dichloromethane showed the peaks at δ 8.2-6.9 (m, 26, ArH), 4.49 (s,4,benzyl-CH$_2$), and 3.05 ppm (s,18,N—CH$_3$). The salt began to turn greenish blue during solvent evaporation and a distinct odor of N,N-dimethyl aniline was evident indicating that partial decomposition of the salt had already occurred. This salt decomposed on heating with a heat gun to a dark residue.

A solution of 50 mg of this salt in 0.05 ml of 2-propanol was spin cast on a DVD. The film showed an initial reflectivity at 650 nanometers of less than about 20 percent. The reflectivity increased to 75 percent after the disc was heated at 100 degrees Celsius for about 10 minutes.

In Example 8 the disodium salt of naphthophthalein, 462 mg (1.0 mmol) was dissolved in methanol (50 ml). To this was added a solution of N,N,N-trimethyl-N-benzylammonium chloride, 373 mg (2.0 mmol) in methanol (10 ml). The resultant mixture was stirred at room temperature for 40 minutes then filtered through Celite. Solvent was removed under vacuum at about 35 to 40 degrees Celsius and the dark blue residue was further dried under vacuum at room temperature overnight. The residue, a dark blue solid weighed 0.84 g. The 1H NMR of the solid in deuterated methanol showed the peaks at delta 8.2-6.9 (m, 26, ArH), 4.48 (s, 4, benzylCH$_2$) and 3.03 parts per million (s, 18, N—CH$_3$).

A small sample (about 50 mg)) of the blue solid was heated in a glass vial by means of a heat gun. The color of the molten mass gradually changed from blue to yellow-brown. This change was less rapid than observed for the compound described in Example 7.

Example 9

Provides the Effect of Quaternary Onium Salt on Absorptivity of Phenolic Indicator Dyes Basic solutions of bromothymol blue (BTB), bromocresol green (BCG) and naphthophthalein (NPT) in methanol and 1,2-dichloroethane were prepared by dissolving the dyes in the appropriate solvents and adding an excess amount of either DCHA or tetraethylammonium hydroxide. UV spectra of these solutions were recorded to determine the extinction coefficients at 650 nanometers. Results are presented in Table 11 below.

TABLE 11

| Dye | Dye (mol/l) | Solvent | Base (~millimoles) | Extinction coefficient at 650 nanometers |
|---|---|---|---|---|
| BTB | $1.6 \times 10^{-5}$ | Methanol | DCHA (~30) | 9,000 |
| BCG | $1.59 \times 10^{-5}$ | Methanol | DCHA (~30) | 21,899 |
| NPT | $2.87 \times 10^{-5}$ | Methanol | DCHA (~30) | 794 |
| BTB | $1.6 \times 10^{-5}$ | Methanol | DCHA (~30) | 19,063 |
| BCG | $1.59 \times 10^{-5}$ | Methanol | DCHA (~30) | 21,962 |
| NPT | $2.87 \times 10^{-5}$ | Methanol | DCHA (~30) | 11,533 |
| BTB | $1.6 \times 10^{-5}$ | 1,2-dichloroethane | Et$_4$N$^+$OH$^-$ (~15) | 263 |
| BCG | $1.59 \times 10^{-5}$ | 1,2-dichloroethane | Et$_4$N$^+$OH$^-$ (~15) | 9,114 |
| NPT | $2.87 \times 10^{-5}$ | 1,2-dichloroethane | Et$_4$N$^+$OH$^-$ (~15) | 199 |
| BTB | $1.6 \times 10^{-5}$ | 1,2-dichloroethane | Et$_4$N$^+$OH$^-$ (~15) | 37,686 |
| BCG | $1.59 \times 10^{-5}$ | 1,2-dichloroethane | Et$_4$N$^+$OH$^-$ (~15) | 41,329 |
| NPT | $2.87 \times 10^{-5}$ | 1,2-dichloroethane | Et$_4$N$^+$OH$^-$ (~15) | 22,230 |

The results provided in Table 11 indicate that in general, the quaternary ammonium base-dye conjugates exhibit a higher absorptivity at 650 nanometers than the amine-dye salts. Further, the effect was particularly pronounced when 1,2-dichloroethane was used as the solvent. Further, this demonstrates a potential benefit for using quaternary onium salt conjugates of dyes to enable lower initial reflectivity using less amount of the dye. It also suggests that this improved sensitivity may be enhanced if a less polar polymer binder than PMMA is used.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include some of the described embodiments. Accordingly, the invention is not to be seen as limited by the foregoing description, but is only limited by the scope of the appended claims.

The invention claimed is:

1. A thermally responsive ink composition consisting of:
at least one halochromic optical-state change material, at least one base, at least one solvent, and at least one binder material; wherein the pH of the ink composition is such that the halochromic optical-state change material remains in its basic state until it is acted upon by a thermal stimulus; and wherein the ink composition is capable of transforming from a first optical state to a second optical state upon a change in pH caused by exposure to a thermal stimulus.

2. The thermally responsive ink composition as defined in claim 1, wherein the pH of the ink composition is due to a change in concentration of the base within the coating.

3. The thermally responsive ink composition as defined in claim 2, wherein the change in pH of the ink composition is due to a change in concentration of the base within the ink composition due to evaporation, sublimation, or degradation of the base.

4. The thermally responsive ink composition as defined in claim 2, wherein the change in concentration of the base within the ink composition is irreversible.

5. The thermally responsive ink composition as defined in claim 1, wherein the halochromic optical-state change material comprises one or more of triarylmethane dyes, azo dyes, squarylium dyes, and their derivatives.

6. The thermally responsive ink composition as defined in claim 1, wherein the amount of the optical-state change material is in a range of from about 25 weight percent to about 35 weight percent based on the weight of a coating formed using the composition.

7. The thermally responsive ink composition as defined in claim 1, wherein the base comprises dihexylamine, dioctylamine, dinonylamine, didecylamine, pentylamine, hexylamine, heptylamine, octylamine, nonylamine, decylamine, dodecylamine, tridecylamine, tetradecylamine, pentadecylamine, 1,8-diazabicyclo[5.4.0]undec-7-ene, 1,8-bis(dimethylamino)naphthalene, 1,4-diazabicyclo[2.2.2]octane, 1,5,7-triazabicyclo[4.4.0]dec-5-ene, tetraethylenepentamine, piperidine, ethanolamine, cyclohexylamine, triethylamine, diisopropylamine, pentamethylpiperidine, 1,5-diazabicyclo[4.3.0]non-5-ene, pyridine, piperidine, N,N-diisopropylethylamine, N,N-dimethylpyridine, morpholine, N,N-dimethylaniline, cyclohexylpiperazine, or a combination thereof.

8. The thermally responsive ink composition as defined in claim 1, wherein the amount of the base is in a range of from about 0.5 milli moles to about 4.0 milli mole equivalents based on the amount of optical-state change material.

9. The thermally responsive ink composition as defined in claim 1, wherein the solvent comprises one or more of a glycol ether solvent, an aromatic hydrocarbon solvent containing at least 7 carbon atoms, an aliphatic hydrocarbon solvent containing at least 6 carbon atoms, a halogenated solvent, an amine based solvent, an amide based solvent, a oxygenated hydrocarbon solvent, or a miscible combination thereof.

10. The thermally responsive ink composition as defined in claim 1, wherein the solvent comprises one or more of dipropylene glycol methyl ether or propylene glycol methyl ether, and diacetone alcohol.

11. The thermally responsive ink composition as defined in claim 1, wherein the amount of the solvent is in a range of from about 80 weight percent to about 90 weight percent based on the weight of the ink composition.

12. The thermally responsive ink composition as defined in claim 1, wherein the binder material comprises one or more of a polymer, an oligomer, a polymeric precursor, or a polymerizable monomer.

13. The thermally responsive ink composition as defined in claim 1, wherein the amount of the binder material is in a range of from about 20 weight percent to about 60 weight percent based on a weight of a coating formed using the composition.

14. The thermally responsive ink composition as defined in claim 1, wherein the thermally responsive ink composition is transformed from the first optical state to the second optical state in a temperature range of from about 25 degrees Celsius to about 200 degrees Celsius.

15. The thermally responsive ink composition as defined in claim 1, wherein the time taken for a film comprising this composition in an optical article to bleach in presence of a thermal source is less than or equal to about 6 seconds.

16. The thermally responsive ink composition as defined in claim 12, wherein the optical reflectivity of the coating after interaction with the thermal source is in a range of about 40 percent to about 100 percent.

17. The thermally responsive ink composition as defined in claim 1, wherein the time taken for a film comprising this composition in an optical article to bleach under storage at a temperature of about 25 degrees Celsius to about 50 degrees Celsius is about 3 months to about 24 months.

18. The thermally responsive ink composition as defined in claim 15, wherein the optical reflectivity of the film after storage is less than or equal to about 20 percent.

19. The thermally responsive ink composition as defined in claim 1, further comprising at least one plasticizer.

20. The thermally responsive ink composition as defined in claim 1, wherein the plasticizer is selected from one or more of abietates, adipates, alkyl sulfonates, azelates, benzoates, citrates, epoxides, glycol ethers and their esters, glutarates, hydrocarbon oils, isobutyrates, oleates, pentaerythritol derivatives, phosphates, phthalates, ionic liquid plasticizers, and poly(caprolactone) triol.

21. A thermally responsive ink composition consisting essentially of:
at least one halochromic optical-state change material, at least one base, at least one solvent, and at least one binder material; wherein the pH of the ink composition is such that the halochromic optical-state change material remains in its basic state until it is acted upon by a thermal stimulus; and wherein the ink composition is capable of transforming from a first optical state to a second optical state upon a change in pH caused by exposure to a thermal stimulus.

22. A thermally responsive coating composition consisting of:
at least one halochromic optical-state change material, at least one base, and at least one binder material; wherein the pH of the coating composition is such that the halochromic optical-state change material remains in its basic state until it is acted upon by a thermal stimulus; and wherein the coating composition is capable of transforming from a first optical state to a second optical state upon a change in pH caused by exposure to a thermal stimulus and wherein the thermally responsive coating composition is essentially free of a solvent.

23. A thermally responsive ink composition consisting of:
a quaternary onium salt of at least one halochromic optical-state change material, at least one solvent, and at least one binder material; wherein the ink composition is capable of irreversibly transforming from a first optical state to a second optical state upon exposure to a thermal stimulus.

24. The composition of claim 23, wherein the quaternary onium salt comprises a quaternary ammonium salt or a quaternary phosphonium salt.

25. A thermally responsive coating composition consisting of:
   a quaternary onium salt of at least one halochromic optical-state change material, and at least one binder material; wherein the ink composition is capable of irreversibly transforming from a first optical state to a second optical state upon exposure to a thermal stimulus, wherein the coating composition is essentially free of a solvent.

26. An article comprising a thermally responsive ink composition deposited in or deposited on the article, wherein the thermally responsive ink composition consists of:
   at least one halochromic optical-state change material, at least one base, at least one solvent, and at least one binder material; wherein the pH of the ink composition is such that the halochromic optical-state change material remains in its basic state; and wherein the ink composition is capable of irreversibly transforming from a first optical state to a second optical state upon exposure to a thermal stimulus.

27. An article comprising a thermally responsive ink composition deposited in or deposited on the article, wherein the thermally responsive ink composition comprises;
   a quaternary onium salt of at least one halochromic optical-state change material, at least one solvent, and at least one binder material; wherein the ink composition is capable of irreversibly transforming from a first optical state to a second optical state upon exposure to a thermal stimulus.

* * * * *